(12) United States Patent
Wisniewski et al.

(10) Patent No.: US 6,413,460 B1
(45) Date of Patent: Jul. 2, 2002

(54) METHOD OF FORMING A PARTIALLY COVERED PANEL

(75) Inventors: Aaron Stanley Wisniewski, Plymouth; Talavane Suryanarayan, Ypsilanti; Hazel Wagner, Brighton; Frederick J. Homburg, Woodhaven, all of MI (US); Calvin Columbus Nichols, Sylvania, OH (US); Charles Luke Berry, Westland, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/151,004

(22) Filed: Sep. 10, 1998

(51) Int. Cl.⁷ ............................................. B29C 45/14
(52) U.S. Cl. ...................... 264/254; 264/255; 264/267; 264/278; 264/328.7; 264/328.8; 425/127; 425/129.1
(58) Field of Search ................................. 264/254, 255, 264/278, 267, 112, 120, 127, 129.1, 328.8, 251, 328.7, 247

(56) References Cited

U.S. PATENT DOCUMENTS

| 5,429,786 A | | 7/1995 | Jogan et al. | |
| 5,759,464 A | * | 6/1998 | Matsumoto et al. | 264/138 |
| 6,004,498 A | * | 12/1999 | Fujii et al. | 264/255 |
| 6,054,087 A | * | 4/2000 | Noirot et al. | 264/251 |

FOREIGN PATENT DOCUMENTS

| JP | 7-276421 | 10/1995 |
| JP | 7-276422 | 10/1995 |
| JP | 7-276425 | 10/1995 |
| JP | 7-290499 | 11/1995 |

* cited by examiner

*Primary Examiner*—Jan H. Silbaugh
*Assistant Examiner*—Edmund H. Lee
(74) *Attorney, Agent, or Firm*—Larry I. Shelton

(57) ABSTRACT

A method of producing a partially covered panel comprising a series of manufacturing steps. A covering is formed to have a perimeter portion. The covering is generally formed using a thermoforming operation. The perimeter portion is formed into a flange-shape. A mold movable between open and closed position is moved to an open position. The mold includes a first and second surface. The covering is placed juxtaposed the first surface. A retainer is extended to retain the covering in position prior to and during the molding operation. The retainer engages the perimeter flange portion of the covering. The mold is moved to the closed position. The retainer, covering and first surface define a first cavity section. A first quantity of molten plastic is injected under pressure into this first cavity section. The molten plastic pushes the flange portion against the retainer and the retainer prevents the seepage of plastic between the first surface and the covering.

After the first cavity is filled, the retainer is retracted and a second quantity of molten plastic is injected into the mold. The second quantity of plastic surrounds the first cavity and forms the partially covered panel. The panel displaces at least two distinct surfaces. One surface comprises the covering and another surface displays the solidified second quantity of plastic.

6 Claims, 4 Drawing Sheets

METHOD OF FORMING A PARTIALLY COVERED PANEL

BACKGROUND OF THE INVENTION

1. Field of the Invention

The present invention is directed to a method of manufacturing a partially covered panel. More specifically, the invention is directed to manufacturing a panel having a covering that covers less than the entire surface of a panel by integrally forming the covering into the panel.

2. Description of the Related Arts

It is known to manufacture panels that display more than one surface material. This is especially useful in automotive interiors such as instrument panels, door trims and center consoles. In these applications, one surface may be formed to have a soft textured surface that is commonly formed from a foam-backed vinyl or urethane covering. The covering is thermoformed into the rough shape of the part and is then secured to a rigid panel. In this way, the panel has an area bounded by the covering that displays an area having a soft texture and another uncovered area that displays the rigid substrate. It was difficult and costly to secure the covering to the substrate and various methods have been proposed to form the covering and substrate in a single molding operation.

Japanese patent application 7-276421, published Oct. 24, 1995, teaches an injection molding method of securing a covering to a substrate to manufacture an automotive instrument panel. A covering is thermoformed to have the shape of the panel and placed within a mold. The covering has a foam inner layer and a "heat fusion layer" at the innermost surface. Molten plastic is injected against the covering to form the panel. The plastic is first injected against the covering and after it passes over the edge of the covering, different areas of the mold inject additional quantities of plastic. The plastic streams meet and weld together in a region beyond the covering. By injecting a first quantity of plastic directly behind the covering that flows over the perimeter, the edge of the covering is not lifted or displaced in the injection molding process. The process described in the 7-276421 patent application forms a seam on the same plane between the plastic and the covering. The perimeter edge of the covering forms the boundary between the rigid plastic and the covering. If the edge is ragged or if the covering is out of alignment, it is visible and displays the flaw. Additionally, the plastic streams meet in an area beyond the perimeter of the covering. The location where two plastic streams meet is called a knit line. Knit lines are often visible and detract from the appearance of the decorative surface. It is desirable to provide a method that is not as sensitive to the placement and dimension of the covering. It is also desirable to provide a method that conceals the knit lines of the plastic article.

U.S. Pat. No. 5,429,786, is also directed to a method of manufacturing a partially covered panel. The U.S. Pat. No. 5,429,786 teaches a compression molding method of forming a panel. In compression molding, a quantity of molten plastic is placed between two open or partially open molds. The molds are brought together to compress the plastic between the molds. The pressure of compression molding is generally much lower than the pressure of injection molding and lighter tools are possible.

In the U S. Pat. No. 5,429,786, a covering having a perimeter flange portion is placed within a recess of a mold. A quantity of molten plastic is placed adjacent to the covering and the molds are closed. The action of closing the molds causes the plastic to flow over the covering flange portion. The flange portion acts to conceal the periphery of the covering within a groove in the finished panel. In the embodiment illustrated in FIG. 10, a fence is used, but the fence does not engage the flange portion or retain the covering in the mold prior to or during molding. The method described in the U.S. Pat. No. 5,429,786 selected compression molding plastic behind the covering in place of injection molding to avoid excessive compression of the foam layer of the skin sheet or production crimps on the skin sheet. While compression molding has the advantage of applying less displacing or crimping force on the covering, it significantly lengthens the cycle time of each molding operation when compared to injection molding. It is desirable to provide an injection molding process as described in the Japanese patent application 7-276421 while retaining the flange portion described in the U.S. Pat. No. 5,429,786. This would combine the high-speed nature of injection molding together with the placement option and seam concealing features of the compression process.

These and other disadvantages of the related art are overcome by the methods taught by the present invention.

SUMMARY OF THE INVENTION

The present invention is directed to a method of producing a partially covered panel comprising a series of manufacturing steps. A covering is formed to have a perimeter portion. The covering is generally formed using a thermoforming operation. The perimeter portion is formed into a flange-shape. A mold movable between an open and closed position is moved to an open position. The mold includes a first and second surface. The covering is placed juxtaposed the first surface. A retainer is extended to retain the covering in position prior to and during the molding operation. The retainer engages the perimeter flange portion of the covering. The mold is moved to the closed position. The retainer, covering and first surface define a first cavity section. A first quantity of molten plastic is injected under pressure into this first cavity section. The molten plastic pushes the flange portion against the retainer and prevents the seepage of plastic between the first surface and the covering.

After the first cavity is filled, the retainer is retracted and a second quantity of molten plastic is injected into the mold. The second quantity of plastic surrounds the first cavity and forms the partially covered panel. The panel displaces at least two distinct surfaces. One surface comprises the covering and another surface displays the solidified second quantity of plastic.

These and other objects, features, and advantages of the present invention will become more readily apparent when viewed in connection with the accompanying drawings wherein like reference numbers correspond to like components.

DETAILED DESCRIPTION OF THE PREFERRED EMBODIMENTS

Figure 1:
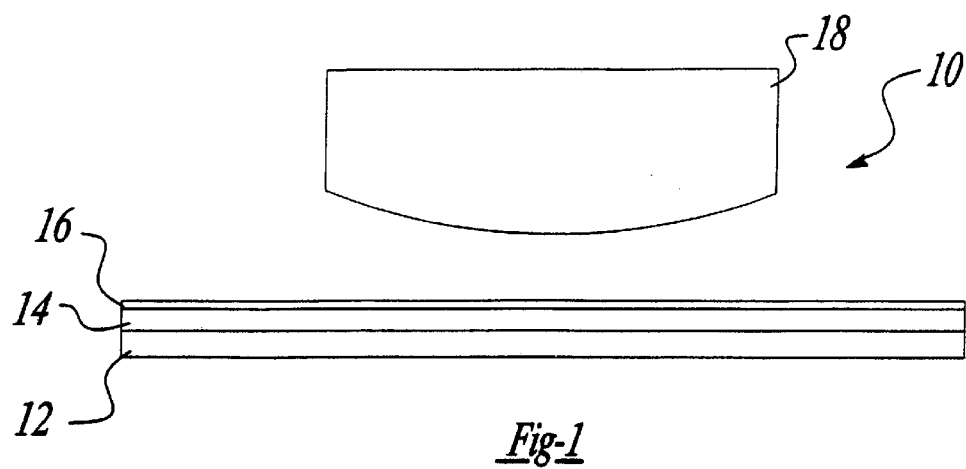
FIG. 1 is a side view of a covering prior to thermoforming.

The present invention will be described through a series of drawings, which illustrate the manufacture of an automotive interior instrument panel. A wide variety of components may be produced using the methods described.

Figure 2:
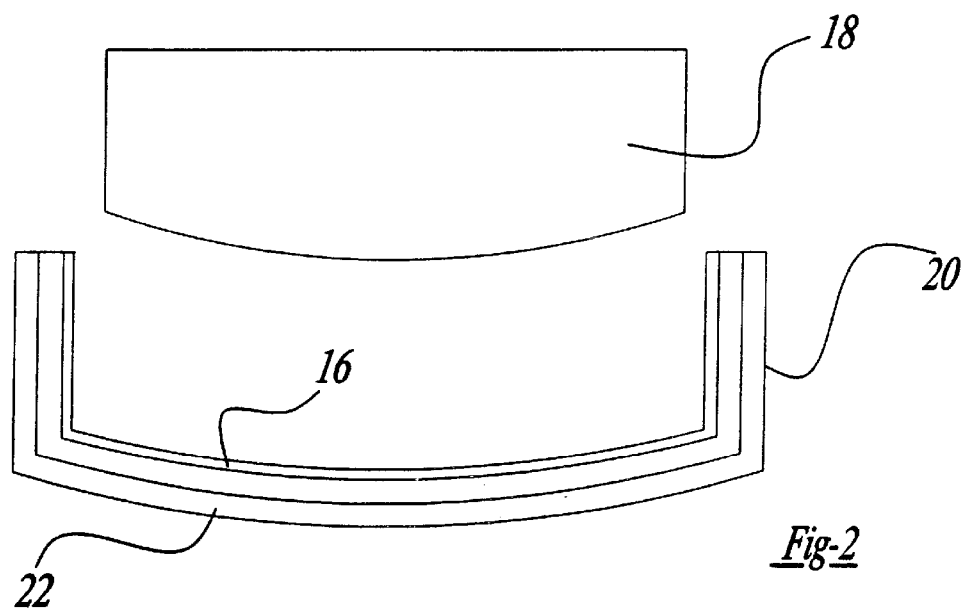
FIG. 2 is a side view of a covering undergoing thermoforming to form flange portions.
Figure 3:
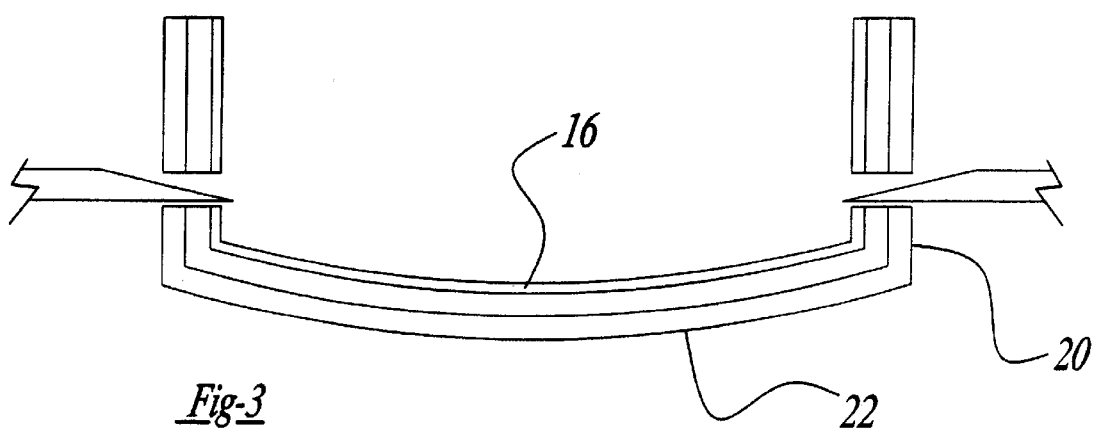
FIG. 3 is a side view of the covering undergoing a trimming operation.

The following items are a word list of the items described in the drawings and are reproduced to aid in understanding the invention:

10 covering
12 sheet
14 foam layer
16 backing layer
18 molding mandrel
20 flange portion
22 covering surface
24 robotically controlled arm
26 vacuum pads
28 mold
30 cavity
32 core
34 first mold surface
36 retainer
38 aperture
40 resin inlet
42 first cavity section
44 second cavity section
46 resin inlets
48 knit line
50 substrate
52 groove
54 uncovered surface The invention utilizes a thermoformed covering 10 as shown in FIGS. 1–3. The covering 10 is made from a sheet 12 of thermoformable material such as vinyl or polyurethane. The sheet 12 has a decorative surface finish such as graining. A layer of foam 14 is secured to the reverse surface of the sheet 12. The foam construction is a polyethylene and polyethylene blend whose percentages are varied depending on the performance requirements for the respective product. The softness of the foam is determined by the end user requirements. As will be described in greater detail below, a heat resistant backing layer 16 is bonded to the foam layer 14. The backing layer 16 bonded the covering to the substrate to form the panel. The backing layer 16 is a compatible material to the substrate material and protects the foam layer from damage by the injection molding temperatures and pressures. The sheet 12 has a thickness between 0.5 mm and 1.0 mm. The foam layer 14 has a thickness between 1.0 mm and 5.0 mm. The backing layer 16 has a thickness between 0.1 mm and 2.0 mm and may not be required in some applications. The covering 10 is heated to become pliable and formed around the molding mandrel 18. The molding mandrel 18 shapes the covering into the shape of the desired covered panel. The covering 10 has a flange portion that lies at a right angle to the covering surface 22. The flange portion is trimmed as shown in FIG. 3 to have a length that is part and design specific.

Figure 4:
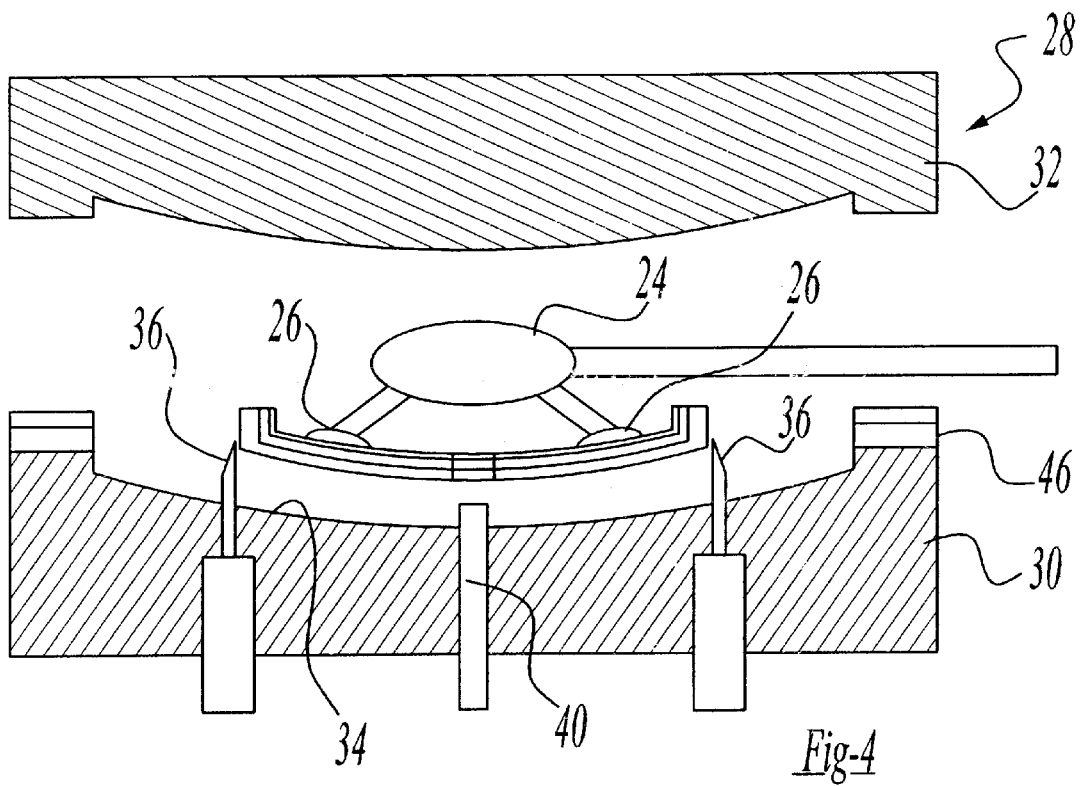
FIG. 4 is a cross-sectional view of an open injection mold illustrating the placement of the covering into the mold with the retainer in an extended position.

The covering 10 may be stacked and stored for later use or the covering 10 may be moved to an injection molding station as illustrated in FIGS. 4–9. The covering is manually loaded into a positioning fixture to register the sheet for robot loading. Locators formed during the thermoforming process assist manual placement of covering into robot fixture for accurate robot positioning into an injection mold. The covering 10 is picked up by a robotically controlled arm 24. This multi-axis arm 24 picks up the covering and precisely aligns it in the mold. Vacuum ports 26 register with the back side of the formed sheet and deposits the covering between an open mold 28 as shown in FIG. 4.

Figure 7:
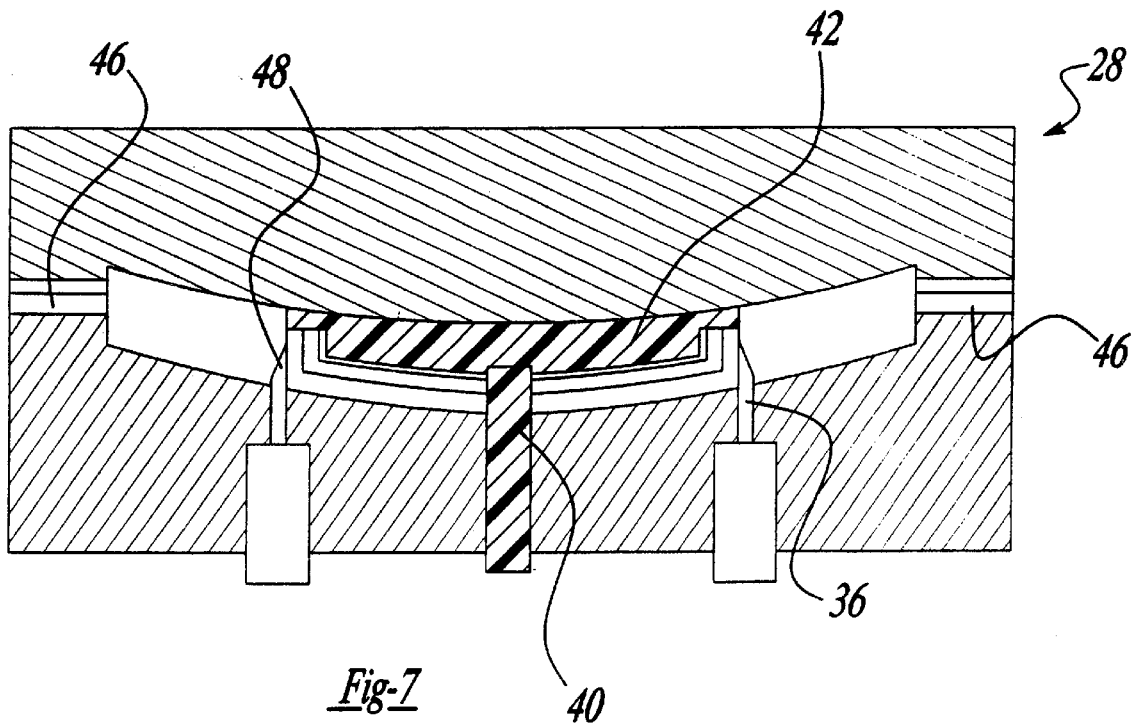
FIG. 7 is a cross-sectional view of the mold illustrated in FIG. 6, retracting the retainer.
Figure 8:
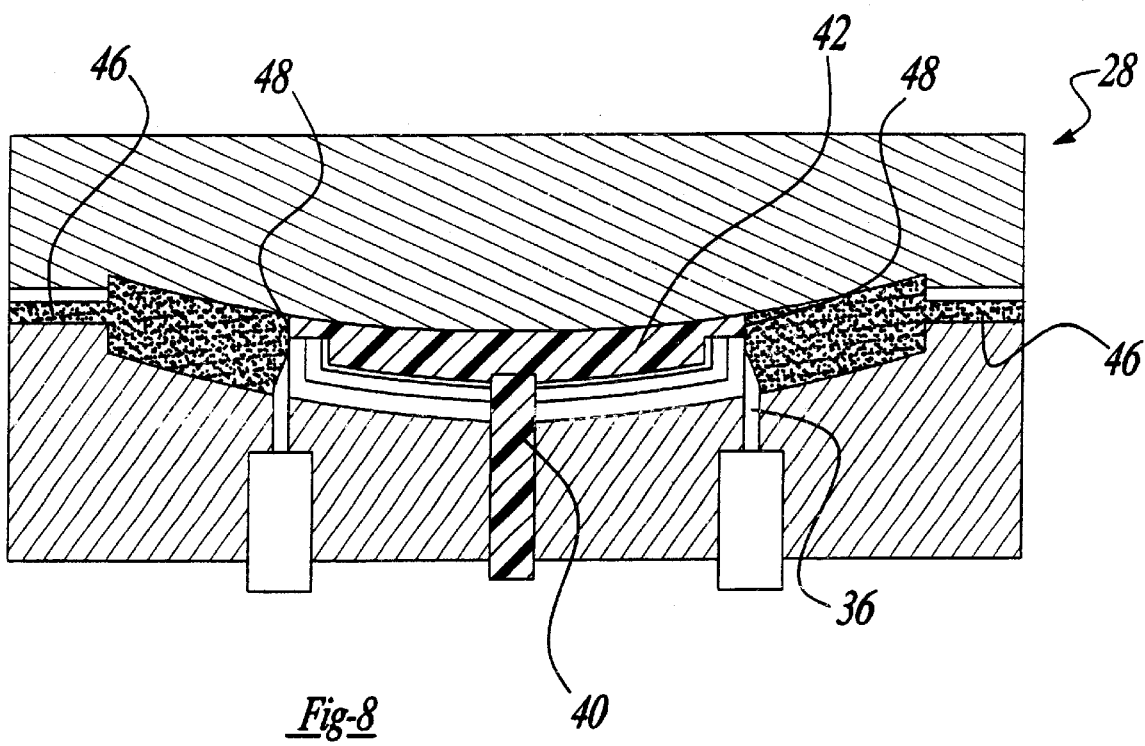
FIG. 8 is a cross-sectional view of the mold illustrated in FIG. 8, injecting a second quantity of plastic into a second cavity.
Figure 9:
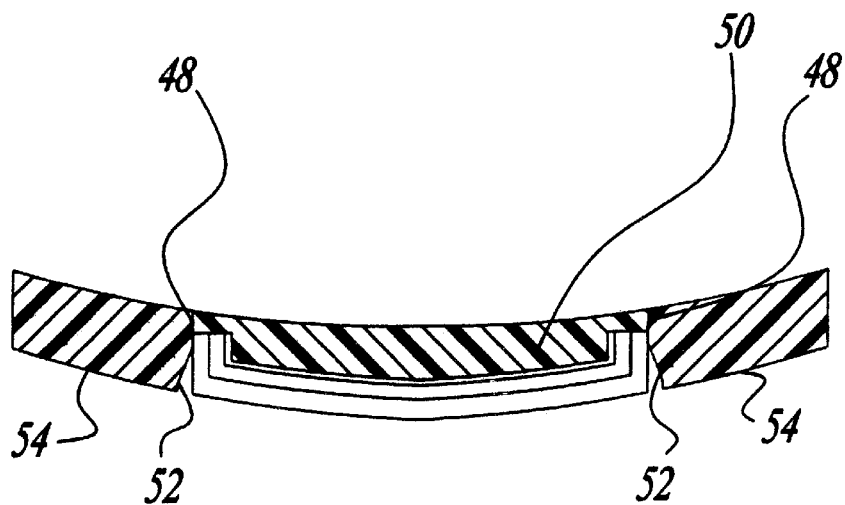
FIG. 9 is a cross-sectional view of a partially covered panel.

The mold 28 includes a stationary cavity 30 and a movable core 32. The cavity 30 includes a first mold surface 34 receiving the covering surface 22. The first mold surface 34 is a movable retainer 36. The retainer 36 moves between the extended position shown in FIGS. 4–6 to a retracted position as shown in FIGS. 7–8. The retainer motion may be horizontal or vertical to the first mold surface with the covering flange portion 20 and positions the covering within the mold 28.

Figure 5:
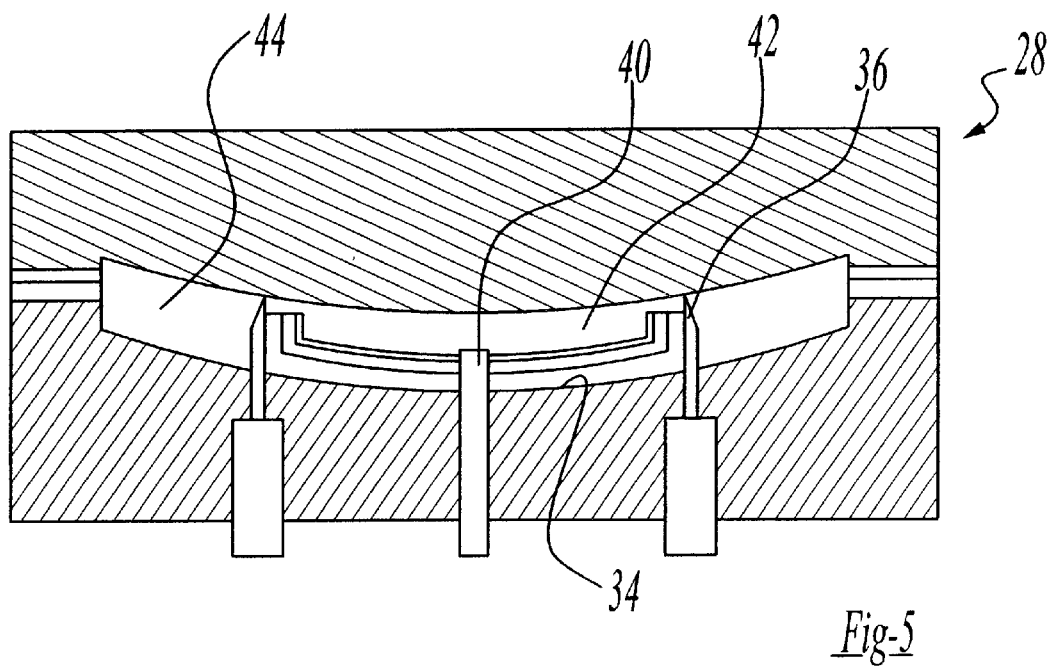
FIG. 5 is a cross-sectional view of the mold illustrated in FIG. 4, with the molds in the closed position.

The cavity 30 includes a number of resin inlets to form the panel. It is generally preferred to place the resin inlets on the stationary mold piece however it is possible to place the resin inlets on the movable member. When the cavity 30 is made stationary, the resin inlet generally protrudes through an aperture 38 in the covering 10. The aperture 38 is located in a portion of the covering that is later cutout to receive another component such as an air register. As an alternative, edge gates and runners can be used in areas where the covering is not present. A resin inlet 40 passes through the aperture 38 and introduces resin to the backing layer 16. The retainer 36 contacts the core 32 and forms a first cavity section 42 bounded by the retainer 36, backing layer 16 and core 32 as shown in FIG. 5.

Figure 6:
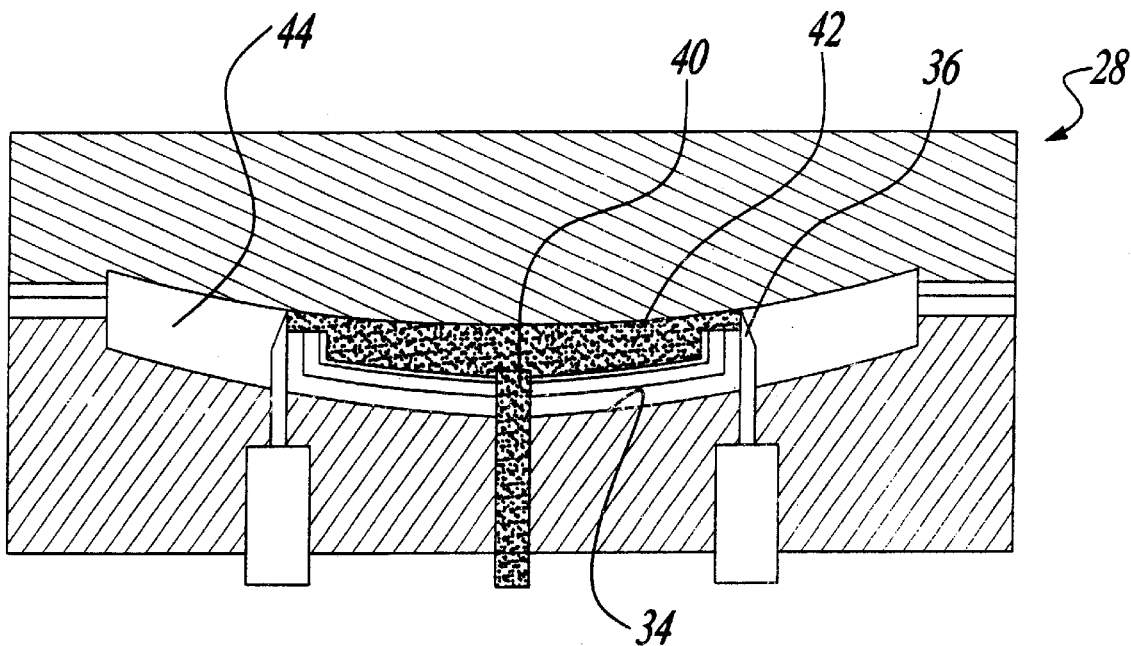
FIG. 6 is a cross-sectional view of the mold illustrated in FIG. 5, injecting a first quantity of plastic into a first cavity.

After the mold 28 is closed, a first quantity of molten plastic is injected into the first cavity section 42 through the resin inlet 40 as shown in FIG. 6. The molten plastic contacts and adheres to the backing layer 16. The backing layer 16 protects the foam layer 14 and sheet 12 from the high injection temperatures and pressures while providing a heat fusible surface to adhere to the plastic. Before the plastic cools, the retainer 36 is moved to a retracted position as shown in FIG. 7. The space bounded by the cavity 30, core 32 and first cavity section 42 forms a second cavity section 44. A second quantity of molten plastic is injected into the second cavity section 44 through the resin inlets 46.

The second quantity of molten plastic adheres to the first quantity of still hot molten plastic. The area where the first and second quantities of plastic meet is the knit line 48. The first and second quantities of plastic solidify to form a rigid plastic substrate 50. The knit line 48 is positioned to be concealed by a groove 52 separating the covering surface 22 and an uncovered surface 54. Sections of the groove are shown in FIGS. 10 and 11.

The present invention has the advantages that the flange portion 20 of the covering 10 perimeter is concealed within the plastic substrate 50. Any imperfections or misalignments are concealed by the groove 52.

Additionally, the sheet 12 is mechanically held an heat bonded to the substrate. The sheet is unable to peel back from the foam layer as ultra violet and sunload heat builds up in the vehicle interior.

Also, this process lends itself to allowing for a soft touch upgrade over a conventional hard instrument panel with process step reduction advantages over the conventional method.

Materials used in this process can be stategically designed for recyclability compatibility. The TPO based materials are highly desired for same family recycling and this invention is based on this realization.

The invention has been illustrated as a method of manufacturing an automotive instrument panel. Other types of panels may be manufactured using the same process and equipment. The invention has also been described using a sequential injection molding process. It is possible to practice the invention utilizing a simultaneous injection of plastic into the mold.

While the best modes for carrying out the invention have been described in detail, those familiar with the art to which this invention relates will recognize various alternative designs and embodiments for practicing the invention as defined by the following claims.

What is claimed is:

1. A method of producing a partially covered panel comprising the following steps:

forming a covering having a perimeter portion;

forming said perimeter portion into a flange;

providing a movable mold having a core and a cavity;

placing said covering with said perimeter flange portion within said mold and juxtaposed said cavity;

closing said mold after placing said covering with said perimeter flange portion therein;

extending a retainer within the closed mold to support said perimeter flange portion and to form a first cavity section, wherein said first cavity section is bounded by said retainer, said covering with said perimeter flange portion, and said core;

injecting a first quantity of molten plastic into said first cavity section to form a covered surface after said mold is closed, wherein the injected first quantity of molten plastic fills said first cavity section;

retracting said retainer to form a second cavity section that is bounded by said covered surface, said core, and said cavity; and filling said second cavity section with a second quantity of molten plastic to form an uncovered surface that is adhered to said covered surface, said perimeter flange portion contained within said first quantity of molten plastic and second quantity of molten plastic, said partially covered panel displaying said covered and uncovered surfaces.

2. The method of claim 1, wherein said second quantity of molten plastic is injected.

3. The method of claim 2, wherein said second cavity section surrounds said first cavity section.

4. The method of claim 1, wherein said retainer extends and retracts from said cavity.

5. The method of claim 1, wherein the retracted retainer extends a distance above said cavity.

6. The method of claim 5, wherein said second quantity of plastic flows over the retracted retainer and forms a groove adjacent said perimeter flange portion.

* * * * *

UNITED STATES PATENT AND TRADEMARK OFFICE
CERTIFICATE OF CORRECTION

PATENT NO.     : 6,413,460 B1
DATED          : July 2, 2002
INVENTOR(S)    : Aaron S. Wisniewski et al.

It is certified that error appears in the above-identified patent and that said Letters Patent is hereby corrected as shown below:

Column 6,
Line 31, "adjacent said perimeter flange portion." should be -- adjacent the retracted perimeter flange portion. --.

Signed and Sealed this

Fourteenth Day of January, 2003

JAMES E. ROGAN
*Director of the United States Patent and Trademark Office*